United States Patent
Suzuki

(10) Patent No.: US 9,977,759 B2
(45) Date of Patent: May 22, 2018

(54) PARALLEL COMPUTING APPARATUS, COMPILING APPARATUS, AND PARALLEL PROCESSING METHOD FOR ENABLING ACCESS TO DATA IN STACK AREA OF THREAD BY ANOTHER THREAD

(71) Applicant: FUJITSU LIMITED, Kawasaki-shi, Kanagawa (JP)

(72) Inventor: Toshihiro Suzuki, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 15/141,886

(22) Filed: Apr. 29, 2016

(65) Prior Publication Data

US 2016/0357703 A1   Dec. 8, 2016

(30) Foreign Application Priority Data

Jun. 4, 2015   (JP) ................. 2015-113657

(51) Int. Cl.
| | |
|---|---|
| G06F 15/173 | (2006.01) |
| G06F 13/16 | (2006.01) |
| G06F 12/08 | (2016.01) |
| G06F 12/0811 | (2016.01) |
| G06F 12/0842 | (2016.01) |

(52) U.S. Cl.
CPC .... *G06F 15/17318* (2013.01); *G06F 12/0811* (2013.01); *G06F 13/1663* (2013.01); *G06F 12/0842* (2013.01); *G06F 2212/283* (2013.01)

(58) Field of Classification Search
None
See application file for complete search history.

(56) References Cited

U.S. PATENT DOCUMENTS

| | | | | |
|---|---|---|---|---|
| 4,445,174 A | * | 4/1984 | Fletcher | G06F 12/084 700/5 |
| 6,665,700 B1 | * | 12/2003 | Sugisaki | G06F 15/16 712/38 |
| 7,853,755 B1 | * | 12/2010 | Agarwal | G06F 12/0811 711/141 |
| 7,937,535 B2 | * | 5/2011 | Ozer | G06F 12/0822 711/141 |
| 8,019,975 B2 | * | 9/2011 | Brashears | G06F 9/3004 712/220 |
| 8,185,693 B2 | * | 5/2012 | Toub | G06F 12/0253 711/119 |

(Continued)

FOREIGN PATENT DOCUMENTS

| | | |
|---|---|---|
| JP | 2005-043959 | 2/2005 |
| JP | 2007-108838 | 4/2007 |
| JP | 2014-106715 | 6/2014 |

*Primary Examiner* — Abu Zar Ghaffari
(74) *Attorney, Agent, or Firm* — Fujitsu Patent Center

(57) ABSTRACT

A parallel computing apparatus includes a first processor that executes a first thread, a second processor that executes a second thread, and a memory. The memory includes a first private area that corresponds to the first thread, a second private area that corresponds to the second thread, and a shared area. The first processor stores first data in the first private area and stores address information that enables access to the first data in the shared area. The second processor stores second data in the second private area, accesses the first data based on the address information, and generates third data based on the first and second data.

4 Claims, 16 Drawing Sheets

(56) References Cited

U.S. PATENT DOCUMENTS

| | | | | |
|---|---|---|---|---|
| 2004/0117558 A1* | 6/2004 | Krick | ............... | G06F 12/0855 |
| | | | | 711/141 |
| 2004/0148475 A1* | 7/2004 | Ogasawara | ........... | G06F 9/3834 |
| | | | | 711/151 |
| 2005/0060709 A1 | 3/2005 | Kanai et al. | | |
| 2009/0193232 A1* | 7/2009 | Watanabe | ........... | G06F 12/0831 |
| | | | | 712/205 |
| 2009/0210649 A1* | 8/2009 | Wan | ................... | G06F 9/30087 |
| | | | | 711/170 |
| 2009/0327610 A1* | 12/2009 | David | ................... | G06F 9/3851 |
| | | | | 711/119 |
| 2010/0115204 A1* | 5/2010 | Li | ...................... | G06F 12/0811 |
| | | | | 711/130 |
| 2011/0078367 A1* | 3/2011 | Minkin | ................ | G06F 12/084 |
| | | | | 711/104 |
| 2013/0332668 A1* | 12/2013 | Diep | .................. | G06F 12/0864 |
| | | | | 711/105 |
| 2013/0346696 A1* | 12/2013 | Park | ................... | G06F 12/0811 |
| | | | | 711/122 |
| 2014/0149719 A1 | 5/2014 | Tabaru | | |
| 2016/0246720 A1* | 8/2016 | Pandey | .................. | G06F 21/12 |

\* cited by examiner

SOURCE CODE
51

```
subroutine sub(sum, a, n, m)
  integer::sum(n), a(n,m), n, m
!$omp do reduction(+:sum)
  do j=1,m
    do i=1,n
      sum(i) = sum(i) + a(i,j)
    end do
  end do
!$omp enddo
end
```

FIG. 7

SOURCE CODE
／ 52

```
subroutine sub(sum, a, n, m)
  integer::sum(n), a(n,m), n, m
  integer::sum_k(n)
!$omp do reduction(+:sum)

do i=1,n
    sum_k(i) = 0
  end do do j=1,m
    do i=1,n
      sum_k(i) = sum_k(i) + a(i, j)
    end do
  end do do i=1,n
    sum(i) = sum(i) + sum_k(i)
  end do !$omp enddo
end
```

FIG. 9

SOURCE CODE 53

```
subroutine sub(sum, a, n, m)
  integer::sum(n), a(n,m), n, m
  integer::sum_k(n)
  integer(8), save::adr(tn*16)
  integer::var(n)
  pointer (ptr, var)

!$omp do reduction(+:sum)
  adr(tid*16+1) = LOC(sum_k)

do i=1, n
    sum_k(i) = 0
  end do do j=1, m
    do i=1, n
      sum_k(i) = sum_k(i) + a(i, j)
    end do
  end do !$omp barrier
  do j=0, tn-1
    ptr=adr(j*16+1)
!$omp do
    do i=1, n
      sum(i) = sum(i) + var(i)
    end do
!$omp end do nowait
  end do
!$omp barrier !$omp enddo
end
```

FIG. 12

PARALLEL COMPUTING APPARATUS, COMPILING APPARATUS, AND PARALLEL PROCESSING METHOD FOR ENABLING ACCESS TO DATA IN STACK AREA OF THREAD BY ANOTHER THREAD

CROSS-REFERENCE TO RELATED APPLICATION

This application is based upon and claims the benefit of priority of the prior Japanese Patent Application No. 2015-113657, filed on Jun. 4, 2015, the entire contents of which are incorporated herein by reference.

FIELD

The embodiments discussed herein relate to a parallel computing apparatus, a compiling apparatus, and a parallel processing method.

BACKGROUND

There are cases in which a parallel computing device that is able to execute a plurality of threads in parallel by using a plurality of processors (processor cores, for example) is used. In an example of parallel processing executed by such a parallel computing device, different threads execute the same kind of operation on different input data in parallel, and each of the plurality of different threads generates intermediate data. Next, the intermediate data generated by the plurality of threads is aggregated to obtain resultant data. This parallel processing is sometimes called reduction processing. Among the compilers that generate object codes executed by parallel computing devices, some compilers generate, through optimization, an object code for reduction processing from a source code that has not been created for parallel processing.

In addition, there has been proposed a scheduling method for causing a plurality of processors to execute a plurality of threads in parallel with a shared memory. According to the proposed scheduling method, semaphores, message queues, message buffers, event flags, barriers, mutexes, etc. may be used as a synchronization mechanism for synchronizing the plurality of threads. These kinds of synchronization mechanism are used depending on the class of the threads to be synchronized.

In addition, there has been proposed a compiling device that generates an object code executable by a shared-memory parallel computing device. The proposed compiling device generates an object code that dynamically selects whether to parallelize processing within a loop by using a plurality of threads when the processing is executed. The generated object code calculates a threshold for the number of loops that could improve the execution efficiency on the basis of the number of instruction cycles per processing within a loop and predetermined parallelization overhead information. The object code executes the processing within a loop in parallel when the number of loops determined when the processing is executed is larger than the threshold. Otherwise, the object code sequentially executes the processing within a loop.

In addition, there has been proposed an operation processing apparatus that includes a plurality of cores that is able to execute threads in parallel and a shared memory. A single storage area in the shared memory is accessed exclusively. With the proposed operation processing apparatus, when two or more threads update data in the single storage area, these threads perform reduction processing before accessing the shared memory. In the reduction processing, the intermediate data generated by the threads is aggregated. In this way, the exclusive access to the single storage area in the shared memory is reduced.

See, for example, Japanese Laid-open Patent Publication Nos. 2005-43959, 2007-108838, and 2014-106715.

For example, each of a plurality of threads has previously been provided with a private area (for example, a stack area) on a memory, and the intermediate data generated by an individual thread is stored in the corresponding private area. In a first method for aggregating the intermediate data generated by a plurality of threads, an area for storing resultant data is allocated in a shared area on a memory, and each thread reflects its intermediate data in the resultant data in the shared area. However, according to this first method, since the resultant data is exclusively accessed by a plurality of threads, there is a problem that overhead is caused to perform the exclusive control.

In a second method for aggregating the intermediate data generated by a plurality of threads, each of the threads stores its intermediate data in a shared area, and one of the threads aggregates the intermediate data generated by the plurality of threads. However, according to the second method, an area for storing the intermediate data needs to be allocated in the shared area, in addition to the area for storing the resultant data. While each thread is able to use its private area without regard to the other threads, the plurality of threads share the shared area. Thus, allocation could be managed by control software such as the operating system (OS). Therefore, there is a problem that overhead is caused to allocate the area for storing the intermediate data. In particular, when the intermediate data is variable-length data such as a variable-length array, there is a problem that overhead is caused to dynamically allocate the area.

SUMMARY

According to one aspect, there is provided a parallel computing apparatus including: a first processor configured to execute a first thread; a second processor configured to execute a second thread; and a memory configured to include a first private area that corresponds to the first thread, a second private area that corresponds to the second thread, and a shared area, wherein the first processor stores first data in the first private area and stores address information that enables access to the first data in the shared area, and wherein the second processor stores second data in the second private area, accesses the first data based on the address information stored in the shared area, and generates third data based on the first data and the second data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a program before parallelization;

FIG. 9 illustrates an example of a first program after parallelization;

FIG. 12 illustrates an example of a second program after parallelization;

DESCRIPTION OF EMBODIMENTS

Figure 1:
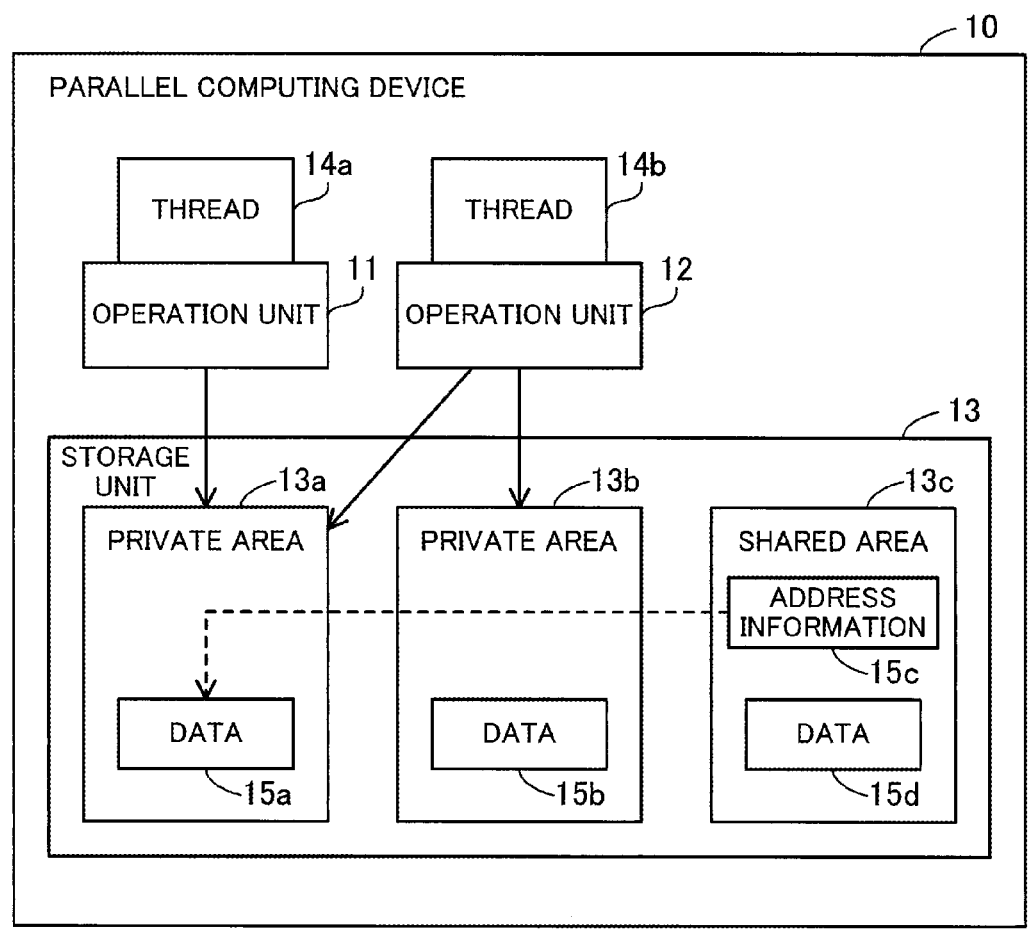
FIG. 1 illustrates a parallel computing device according to a first embodiment.

Hereinafter, embodiments will be described with reference to the accompanying drawings, wherein like reference numerals refer to like elements throughout.

[First Embodiment]

First, a first embodiment will be described.

FIG. 1 illustrates a parallel computing device 10 according to a first embodiment.

The parallel computing device 10 according to the first embodiment is capable of executing a plurality of threads in parallel. For example, the parallel computing device 10 may be a client computer operated by a user or a server computer accessed by a client computer.

The parallel computing device 10 includes operation units 11 and 12 and a storage unit 13. For example, the operation units 11 and 12 are processors such as central processing units (CPUs) or CPU cores. For example, the operation units 11 and 12 execute programs stored in a memory such as the storage unit 13. The programs to be executed include a parallel processing program. The storage unit 13 is a volatile semiconductor memory such as a random access memory (RAM), for example.

In the first embodiment, the operation unit 11 executes a thread 14a, and the operation unit 12 executes a thread 14b. The storage unit 13 includes private areas 13a and 13b and a shared area 13c. The private area 13a is an area that corresponds to the thread 14a and is a stack area allocated to the thread 14a, for example. The private area 13b is an area that corresponds to the thread 14b and is a thread area allocated to the thread 14b, for example. Both the threads 14a and 14b use the shared area 13c.

The thread 14a uses the private area 13a on the basis of its address space. The thread 14b uses the private area 13b on the basis of an address space independent of the thread 14a. The thread 14a uses the private area 13a without regard to the thread 14b, and the thread 14b uses the private area 13b without regard to the thread 14a. Thus, a relatively small cost is needed to dynamically allocate an area in the private area 13a or 13b. In contrast, since the shared area 13c is used by both the threads 14a and 14b, the shared area 13c is managed by control software such as an operating system (OS). Therefore, a relatively large cost is needed to dynamically allocate an area in the shared area 13c.

The thread 14a generates data 15a (first data) as intermediate data and stores the data 15a in the private area 13a. The thread 14b generates data 15b (second data) as intermediate data and stores the data 15b in the private area 13b. The data 15a and 15b may be generated in parallel. The data 15a and 15b is aggregated, and data 15d (third data) is generated as resultant data. Examples of the aggregation operation include: arithmetic operations such as addition, subtraction, and multiplication; logic operations such as a logical AND and a logical OR; and selection operations such as a maximal value selection and a minimum value selection. The data 15d is stored in the shared area 13c, for example.

The data 15a stored in the private area 13a is uniquely managed by the thread 14a, and the data 15a is not accessed by the thread 14b in principle. In addition, the data 15b stored in the private area 13b is uniquely managed by the thread 14b, and the data 15b is not accessed by the thread 14a in principle. In contrast, in the parallel computing device 10, the data 15a in the private area 13a and the data 15b in the private area 13b are efficiently aggregated as follows to generate the data 15d.

The thread 14a generates address information 15c that enables access to the data 15a in the private area 13a and stores the address information 15c in the shared area 13c. For example, the address information 15c is an initial physical address indicating the area in which the data 15a is stored or an area in which a series of data including the data 15a is stored. The thread 14a may generate the address information 15c after or before generating the data 15a.

The thread 14b reads the address information 15c from the shared area 13c and accesses the data 15a in the private area 13a on the basis of the address information 15c. Next, the thread 14b aggregates the data 15a in the private area 13a and the data 15b in the private area 13b, namely, the intermediate data generated by the threads 14a and 14b, and generates the data 15d. The thread 14b stores the generated data 15d in the shared area 13c, for example.

With the parallel computing device according to the first embodiment 10, the operation units 11 and 12 start the threads 14a and 14b, respectively. In addition, the thread 14a stores the data 15a in the private area 13a and stores the address information 15c in the shared area 13c. The thread 14b stores the data 15b in the private area 13b. In addition, the thread 14b accesses the data 15a on the basis of the address information 15c and generates the data 15d from the data 15a and 15b.

In this way, unlike the above second method in which the data 15a and 15b, which is the intermediate data, is stored in the shared area 13c, since no area needs to be dynamically allocated in the shared area 13c in the present embodiment, the overhead, which is caused by the above second method, is not caused in the present embodiment. In addition, unlike the above first method in which the thread 14a reflects the data 15a in the data 15d and the thread 14b reflects the data 15b in the data 15d, since exclusive control between the threads 14a and 14b is not performed in the present embodiment, the above overhead, which is caused by the first method in which exclusive control is performed, is not caused in the present embodiment. Thus, the data 15a and 15b generated by the threads 14a and 14b is aggregated at high speed. In addition, since the thread 14b that has generated the data 15b aggregates the data 15a and 15b, no new thread is started. Namely, while overhead is caused if a new thread is started, since no new thread is started in the present embodiment, no such overhead is caused in the present embodiment.

[Second Embodiment]

Next, a second embodiment will be described.

Figure 2:
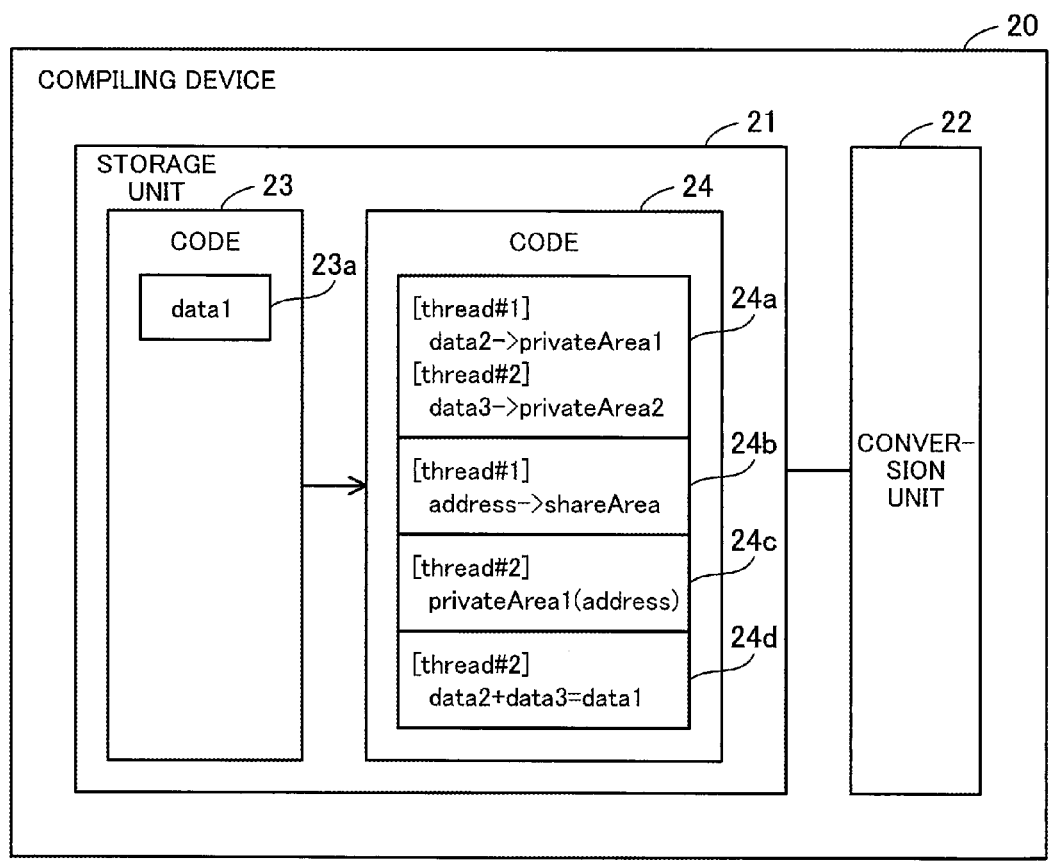
FIG. 2 illustrates a compiling device according to a second embodiment.

FIG. 2 illustrates a compiling device 20 according to a second embodiment.

The compiling device 20 according to the second embodiment generates a code executed by the parallel computing device 10 according to the first embodiment. The compiling device 20 may be a client computer operated by a user or a server computer accessed by a client computer. A single device may be configured to function as the parallel computing device 10 and the compiling device 20.

The compiling device 20 includes a storage unit 21 and a conversion unit 22. For example, the storage unit 21 is a volatile storage device such as a RAM or a non-volatile storage device such as a hard disk drive (HDD) or a flash memory. For example, the conversion unit 22 is a processor such as a CPU or a digital signal processor (DSP). The conversion unit 22 may include an electronic circuit for specific use, such as an application specific integrated circuit (ASIC) or a field programmable gate array (FPGA). The processor executes programs stored in a memory, and the programs to be executed include a compiler program. A group of processors (multiprocessor) may be referred to as a "processor."

The storage unit 21 holds a code 23 (a first code). The code 23 may be a source code, an intermediate code obtained by converting a source code, or an object code before optimization. The code 23 includes an instruction 23a that indicates generating the data 15d (first data). The conversion unit 22 converts the code 23 stored in the storage unit 21 into a code 24. The code 24 indicates starting the thread 14a (a first thread) that generates the data 15a (second data) and the thread 14b (a second thread) that generates the data 15b (third data) and the data 15d on the basis of the data 15a and 15b. The code 24 may be a source code, an intermediate code, or an object code. For example, the code 24 is stored in the storage unit 21.

The code 24 obtained by converting the code 23 includes instructions 24a to 24d (first to fourth instructions).

The instruction 24a indicates causing the thread 14a to store the data 15a in the private area 13a that corresponds to the thread 14a and causing the thread 14b to store the data 15b in the private area 13b that corresponds to the thread 14b. The storage of the data 15a and the storage of the data 15b may be executed in parallel. The instruction 24b indicates causing the thread 14a to store the address information 15c that enables access to the data 15a in the shared area 13c. The instruction 24c indicates causing the thread 14b to access the data 15a stored in the private area 13a on the basis of the address information 15c stored in the shared area 13c. The instruction 24d indicates causing the thread 14b to aggregate the data 15a and 15b and generate the data 15d.

With this compiling device according to the second embodiment 20, the parallel processing code 24 is generated from the code 23 that has not been created for parallel processing. In this way, the calculation is performed faster by utilizing operation capabilities of a computer. In addition, the intermediate data generated by the threads is aggregated faster. Namely, unlike the above second method in which the data 15a and 15b is stored in the shared area 13c, since no area needs to be dynamically allocated in the shared area 13c in the present embodiment, the overhead, which is caused by the above second method, is not caused in the present embodiment. In addition, unlike the above first method in which the thread 14a reflects the data 15a in the data 15d and the thread 14b reflects the data 15b in the data 15d, since exclusive control between the threads 14a and 14b is not performed in the present embodiment, the above overhead, which is caused by the first method in which exclusive control is performed, is not caused in the present embodiment. Thus, since the thread 14b that has generated the data 15b aggregates the data 15a and 15b, no new thread is started. Namely, while overhead is caused if a new thread is started, since no new thread is started in the present embodiment, no such overhead is caused in the present embodiment.

[Third Embodiment]

Next, a third embodiment will be described.

Figure 3:
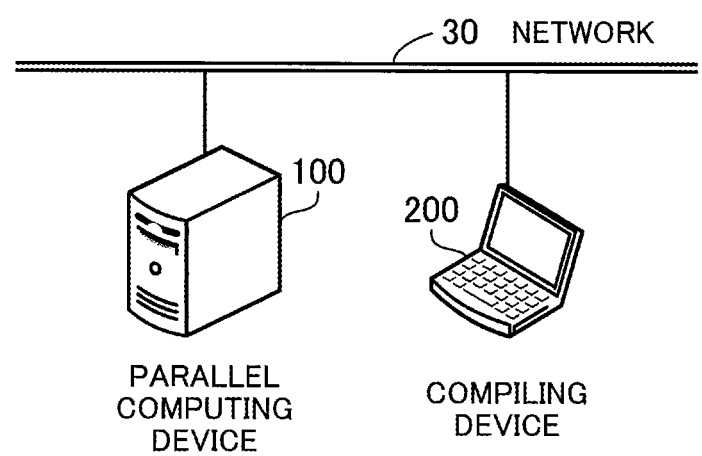
FIG. 3 illustrates an information processing system according to a third embodiment.

FIG. 3 illustrates an information processing system according to a third embodiment.

The information processing system according to the third embodiment includes a parallel computing device 100 and a compiling device 200. The parallel computing device 100 and the compiling device 200 are connected to each other via a network 30. Each of the parallel computing device 100 and the compiling device 200 may be a client computer operated by a user or a server computer accessed by a client computer via the network 30. The parallel computing device 100 corresponds to the parallel computing device 10 according to the first embodiment. The compiling device 200 corresponds to the compiling device 20 according to the second embodiment.

The parallel computing device 100 is a shared-memory multiprocessor that executes a plurality of threads in parallel by using a plurality of CPU cores. The compiling device 200 converts a source code created by a user into an object code executable by the parallel computing device 100. The compiling device 200 is able to generate a parallel processing object code that enables starting a plurality of threads that operate in parallel from a source code that has not been created for parallel processing. The compiling device 200 transmits the generated object code to the parallel computing device 100. While the device that compiles a program and the device that executes the program are separately arranged in the third embodiment, a single device may be configured to compile and execute the program.

Figure 4:
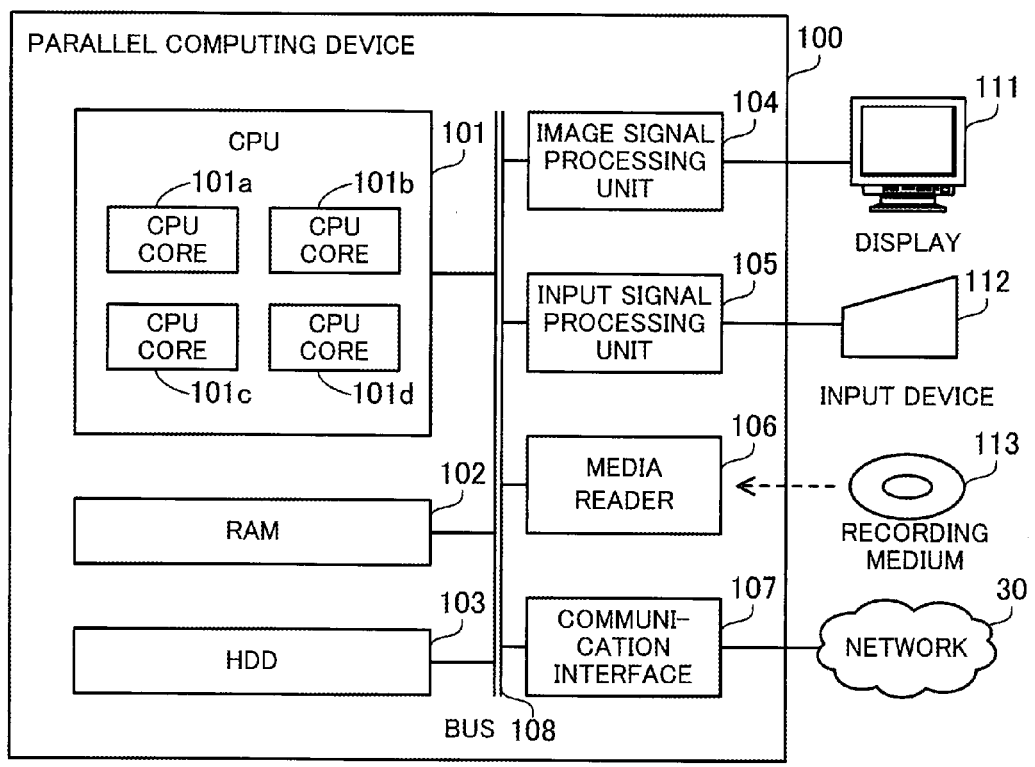
FIG. 4 is a block diagram illustrating a hardware example of a parallel computing device.

FIG. 4 is a block diagram illustrating a hardware example of the parallel computing device 100.

The parallel computing device 100 includes a CPU 101, a RAM 102, an HDD 103, an image signal processing unit 104, an input signal processing unit 105, a media reader 106, and a communication interface 107. These units are connected to a bus 108.

The CPU 101 is a processor that executes program instructions. The CPU 101 loads at least part of a program or data stored in the HDD 103 to the RAM 102 and executes a program. The CPU 101 includes CPU cores 101a to 101d. The CPU cores 101a to 101d are able to execute threads in parallel. In addition, each of the CPU cores 101a to 101d includes a cache memory faster than the RAM 102. The number of CPU cores included in the CPU 101 is not limited. Namely, the CPU 101 may include two or more CPU cores. Each of or the group of the CPU cores 101a to 101d may be referred to as a "processor." In addition, the CPU 101 may be referred to as a "processor."

The RAM 102 is a volatile semiconductor memory that temporarily holds programs executed by the CPU 101 or data used by the CPU 101 for operations. The parallel computing device 100 may include a different kind of memory other than the RAM. The parallel computing device 100 may include a plurality of memories.

The HDD 103 is a non-volatile storage device that holds an OS, middleware, software programs such as application software, and data. The programs include a program compiled by the compiling device 200. The parallel computing device 100 may include a different kind of storage device such as a flash memory or a solid state drive (SSD). The parallel computing device 100 may include a plurality of non-volatile storage devices.

The image signal processing unit 104 outputs an image to a display 111 connected to the parallel computing device 100 in accordance with an instruction from the CPU 101. Examples of the display 111 include a cathode ray tube (CRT) display, a liquid crystal display (LCD), a plasma display panel (PDP), and an organic electro-luminescence (OEL) display.

The input signal processing unit 105 acquires an input signal from an input device 112 connected to the parallel computing device 100 and outputs the input signal to the CPU 101. Examples of the input device 112 include a pointing device such as a mouse, a touch panel, a touch pad, or a trackball, a keyboard, a remote controller, and a button switch. A plurality of kinds of input device may be connected to the parallel computing device 100, The media reader 106 is a reading device that reads programs or data recorded in a recording medium 113. Examples of the recording medium 113 include a magnetic disk such as a flexible disk (FD) or an HDD, an optical disc such as a compact disc (CD) or a digital versatile disc (DVD), a magneto-optical disk (MO), and a semiconductor memory. For example, the media reader 106 stores a program or data read from the recording medium 113 in the RAM 102 or the HDD 103.

The communication interface 107 is an interface that is connected to the network 30 and that communicates with other devices such as the compiling device 200 via the network 30. The communication interface 107 may be a wired communication interface connected to a communication device such as a switch via a cable or a wireless communication interface connected to a base station via a wireless link.

The media reader 106 may be absent in the parallel computing device 100. The image signal processing unit 104 and the input signal processing unit 105 may be absent in the parallel computing device 100 if a terminal operated by a user has the equivalent functions. The display 111 or the input device 112 may be incorporated in the enclosure of the parallel computing device 100. The CPU cores 101a and 101b correspond to the operation units 11 and 12 according to the first embodiment, respectively. The RAM 102 corresponds to the storage unit 13 according to the first embodiment.

Figure 5:
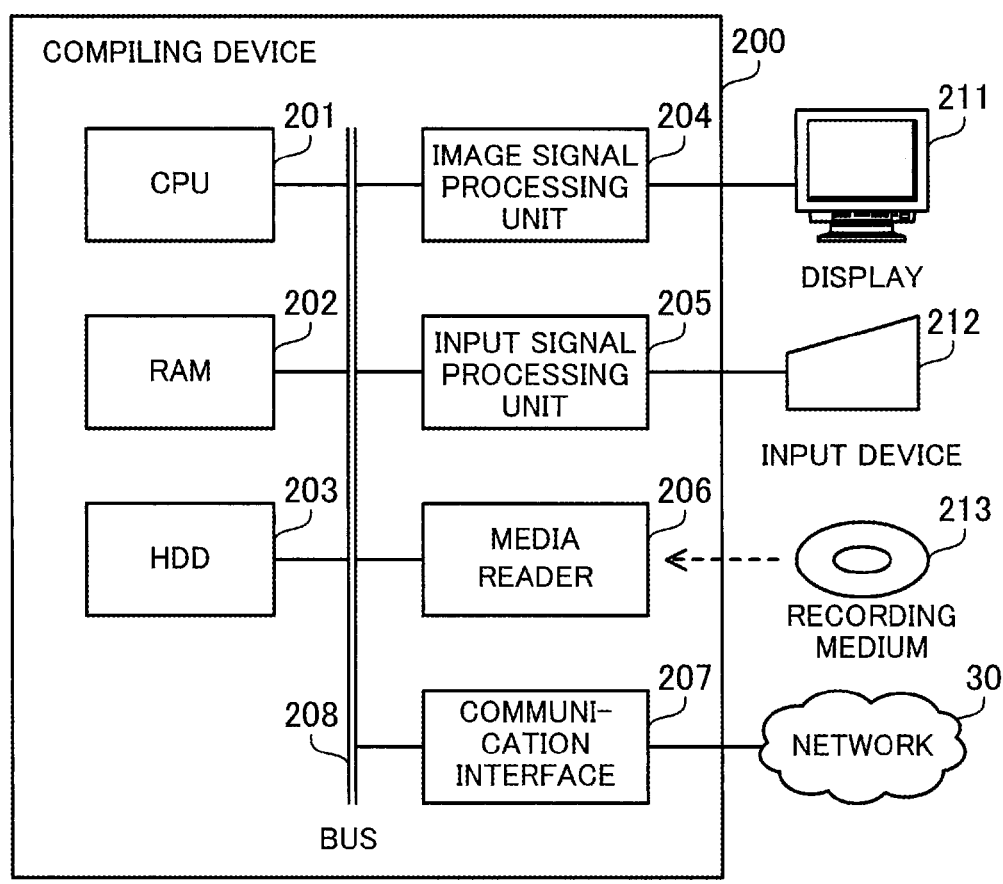
FIG. 5 is a block diagram illustrating a hardware example of a compiling device.

FIG. 5 is a block diagram illustrating a hardware example of the compiling device 200.

The compiling device 200 includes a CPU 201, a RAM 202, an HDD 203, an image signal processing unit 204, an input signal processing unit 205, a media reader 206, and a communication interface 207. These units are connected to a bus 208.

The CPU 201 has functions equivalent to those of the CPU 101 in the parallel computing device 100. However, the CPU 201 may include only one CPU core and does not need to be a multiprocessor. The RAM 202 has functions equivalent to those of the RAM 102 in the parallel computing device 100. The HDD 203 has functions equivalent to those of the HDD 103 in the parallel computing device 100. The programs stored in the HDD 203 include a compiler program.

The image signal processing unit 204 has functions equivalent to those of the image signal processing unit 104 in the parallel computing device 100. The image signal processing unit 204 outputs an image to a display 211 connected to the compiling device 200. The input signal processing unit 205 has functions equivalent to those of the input signal processing unit 105 in the parallel computing device 100. The input signal processing unit 205 acquires an input signal from an input device 212 connected to the compiling device 200.

The media reader 206 has functions equivalent to those of the media reader 106 in the parallel computing device 100. The media reader 206 reads programs or data recorded in a recording medium 213. The recording medium 113 and the recording medium 213 may be the same medium. The communication interface 207 has functions equivalent to those of the communication interface 107 in the parallel computing device 100. The communication interface 207 is connected to the network 30.

The media reader 206 may be absent in the compiling device 200. The image signal processing unit 204 and the input signal processing unit 205 may be absent in the compiling device 200 if a terminal operated by a user has the equivalent functions. The display 211 or the input device 212 may be incorporated in the enclosure of the compiling device 200. The CPU 201 corresponds to the conversion unit 22 according to the second embodiment. The RAM 202 corresponds to the storage unit 21 according to the second embodiment.

Next, an array operation executed by the parallel computing device 100 will be described.

Figure 6:
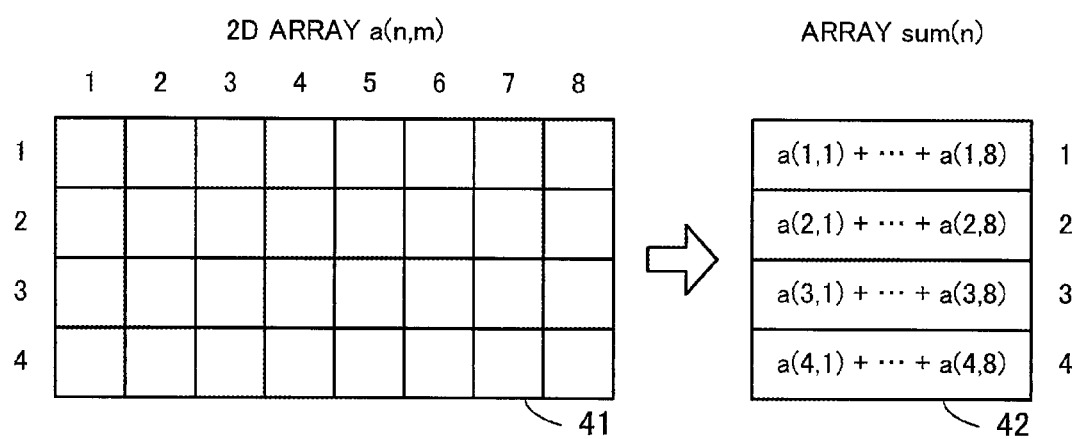
FIG. 6 illustrates an example of an array operation before parallelization.

FIG. 6 illustrates an example of an array operation before parallelization.

In this operation, a two-dimensional (2D) array 41 (a 2D array a) of n rows and m columns (each of "n" and "m" is an integer of 2 or more) is given as input data. In addition, an array 42 (an array sum) of n rows is generated from the 2D array 41 as resultant data.

The parallel computing device 100 aggregates the values of all the columns in an i-th row (i=1 to n) in the 2D array 41 and stores the sum in the i-th row in the array 42. Namely, the parallel computing device 100 stores the sum of a(1,1) to a(1,m) in sum(1). In addition, the parallel computing device 100 stores the sum of a(2,1) to a(2,m) in sum(2). In addition, the parallel computing device 100 stores the sum of a(n,1) to a(n,m) in sum(n). For each of description, the following description will be made by using relatively small input data of 4 rows and 8 columns as an example, as needed.

The parallel computing device 100 is able to parallelize the array operation by using the CPU cores 101a to 101d (reduction processing). The parallel computing device 100 divides the 2D array 41 into a plurality of column groups and allocates a divided column group to an individual one of the CPU cores 101a to 101d. For example, the 1st and 2nd columns are allocated to the CPU core 101a, the 3rd and 4th columns to the CPU core 101b, the 5th and 6th columns to the CPU core 101c, and the 7th and 8th columns to the CPU core 101d. Each of the CPU cores 101a to 101d aggregates the values in its allocated column group in the 2D array 41 per row and generates intermediate data. The array 42 is generated by aggregating the intermediate data generated by the CPU cores 101a to 101d per row.

FIG. 7 illustrates an example of a program before parallelization.

A source code 51 represents the array operation illustrated in FIG. 6. The compiling device 200 compiles the source code 51 to generate an object code executed by the parallel computing device 100. In the source code 51, the integers n and m, the array sum of n rows of an integer type, and the 2D array a of n rows and m columns of an integer type are defined. In the source code 51, loop variables i and j are also defined. In addition, in the source code 51, a nested loop including an outer loop in which the value of the loop variable j is increased from 1 to m by 1 and an inner loop in which the value of the loop variable i is increased from 1 to n by 1 is defined. In the inner loop, an operation of adding a(i,j) to sum(i) is defined. Namely, the source code 51 indicates performing sequential processing on the 2D array 41 from the first to m-th column.

In the source code 51, an Open Multi-Processing (MP) directive is added in the nested loop section. The OpenMP directive is a parallelization directive added by the user to the source code 51. When a compile option for enabling the OpenMP directive is specified, the compiling device 200 generates a parallel processing object code from the source code 51 within the range to which the OpenMP directive is added. In contrast, a compile option for enabling the OpenMP directive is not specified, the compiling device 200 ignores the OpenMP directive and generates a sequential processing object code from the source code 51.

More specifically, in the source code 51, a reduction directive specifying "+" as a reduction operator and "sum" as a reduction variable is added. The reduction operator "+" indicates aggregating the intermediate data generated by a plurality of threads in parallel through addition. Other reduction operators such "−" (subtraction), "×" (multiplication), ".AND." (logical AND), ".OR." (logical OR), "MAX" (maximal value selection), and "MIN" (minimum value selection) and other user-defined operators may be used. The reduction variable "sum" indicates that the variable for storing the final resultant data is the array sum.

Next, two methods for realizing the reduction processing will be described.

Figure 8:
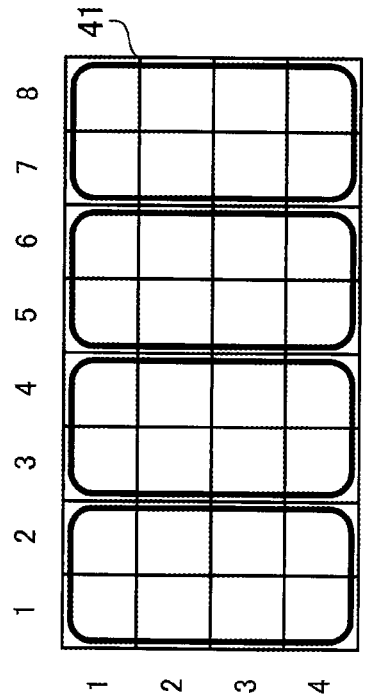
FIG. 8 illustrates an example of first reduction processing.
Figure 8:
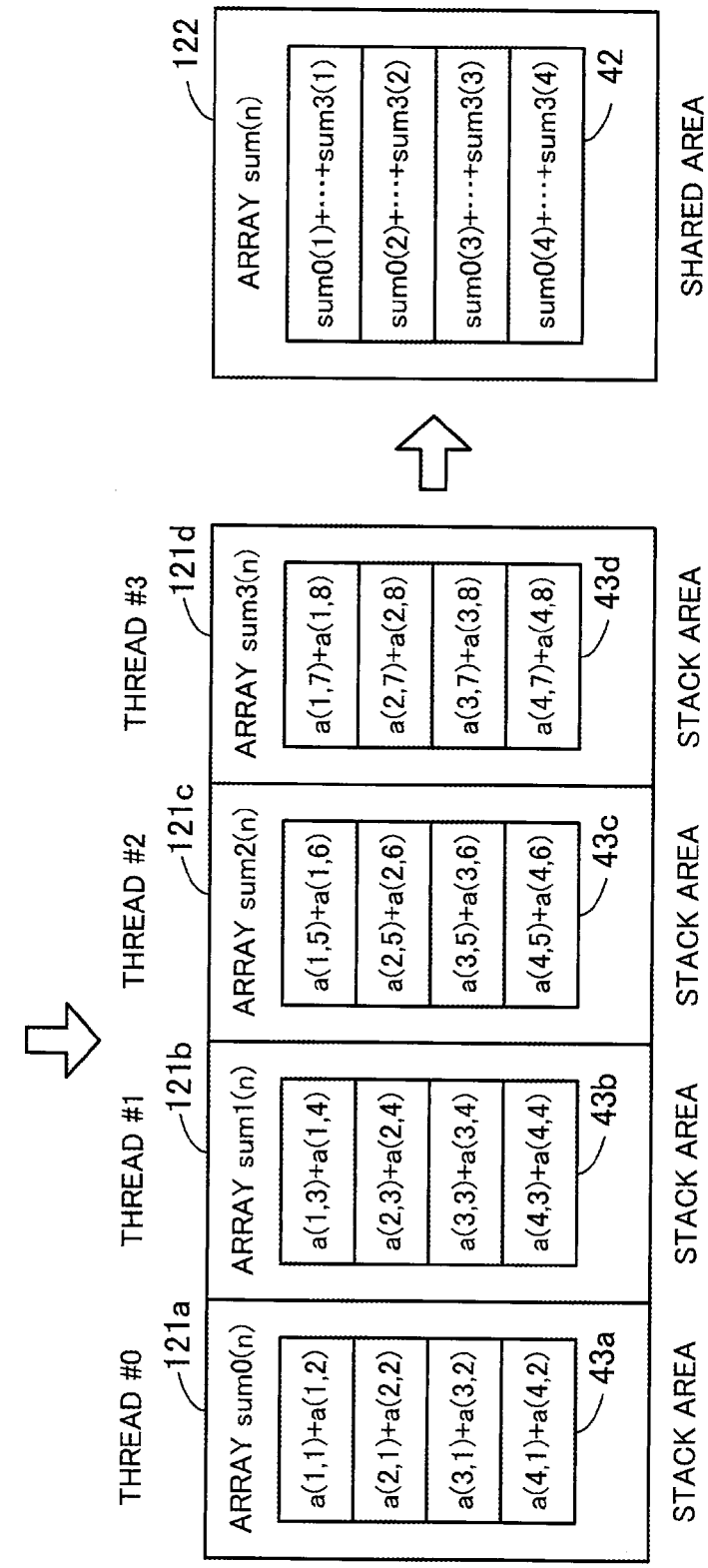

FIG. 8 illustrates an example of first reduction processing.

The following description will be made assuming that the parallel computing device 100 uses the CPU cores 101a to 101d to execute four threads in parallel. The CPU cores 101a to 101d start threads #0 to #3, respectively.

The parallel computing device 100 allocates a stack area 121a that corresponds to the thread #0 in the RAM 102. The stack area 121a is a storage area that locally stores data generated by the thread #0. The thread #0 is able to use the stack area 121a independently of the other threads on the basis of its address space. Even when variable-length data is stored, a memory area is not dynamically allocated to the stack area 121a by the OS. Thus, the cost of the usage is relatively small. Likewise, the parallel computing device 100 allocates stack areas 121b to 121d that correspond to the threads #1 to #3, respectively, in the RAM 102.

In addition, the parallel computing device 100 allocates a shared area 122 in the RAM 102. The shared area 122 is a storage area accessible by the threads #0 to #3. When variable-length data is stored, a memory area is dynamically allocated to the shared area 122 by the OS. Thus, the cost of the usage is larger than that of the stack areas 121a to 121d. In addition, when two or more threads simultaneously access a single area in the shared area 122, exclusive control is performed.

When parallelizing the array operation illustrated in FIGS. 6 and 7, the thread #0 generates an array 43a (array sum0), which is a copy of the reduction variable "sum," in the stack area 121a. Likewise, the threads #1 to #3 generate arrays 43b to 43d (arrays sum1 to sum3), which are copies of the reduction variable "sum," in the stack areas 121b to 121d, respectively. In addition, the parallel computing device 100 generates the array 42 (array sum), which is the original of the reduction variable "sum," in the shared area 122. Attributes of the arrays 43a to 43d such as the data type, dimension, and length are the same as those of the array 42.

The 1st and 2nd columns in the 2D array 41 are allocated to the thread #0. The thread #0 performs an array operation on the 1st and 2nd columns, the array operation being a subset of the array operation performed on the entire 2D array 41, and stores the obtained intermediate data in the array 43a. Namely, the thread #0 stores the sum of a(i,1) and a(i,2) in sum0(i) (i=1 to 4).

Likewise, the 3rd and 4th columns in the 2D array 41 are allocated to the thread #1. The thread #1 stores the sum of a(i,3) and a(i,4) in sum1(i) (i=1 to 4). The 5th and 6th columns in the 2D array 41 are allocated to the thread #2. The thread #2 stores the sum of a(i,5) and a(i,6) in sum2(i) (i=1 to 4). The 7th and 8th columns in the 2D array 41 are allocated to the thread #3. The thread #3 stores the sum of a(i,7) and a(i,8) in sum3(i) (i=1 to 4).

The intermediate data to be stored in the arrays 43a to 43d may be generated by the threads #0 to #3 in parallel. The parallel computing device 100 aggregates the intermediate data stored in the arrays 43a to 43d and stores the resultant data in the array sum. According to the first method, the parallel computing device 100 aggregates the intermediate data as follows.

The thread #0 adds a value stored in the array 43a in the stack area 121a to the corresponding value in the array 42 in the shared area 122. Namely, the thread #0 adds sum0(i) to sum(i) (i=1 to 4). The thread #1 adds a value stored in the array 43b in the stack area 121b to the corresponding value in the array 42 in the shared area 122. Namely, the thread #1 adds sum1(i) to sum(i) (i=1 to 4). The thread #2 adds a value stored in the array 43c in the stack area 121c to the corresponding value in the array 42 in the shared area 122. Namely, the thread #2 adds sum2(i) to sum(i) (i=1 to 4). The thread #3 adds a value stored in the array 43d in the stack area 121d to the corresponding value in the array 42 in the shared area 122. Namely, the thread #3 adds sum3(i) to sum(i) (i=1 to 4).

In this way, sum(i) represents the sum of sum0(i) to sum3(i). Namely, sum(i) calculated in this way signifies the sum of a(i,1) to a(i,8). Thus, whether parallelization is performed or not, the same resultant data is stored in the array 42 in principle. However, depending on the variable type, for example, when an element in the array 42 is a floating-point number, the order of operations could be changed, and as a result, an operation error could occur. In addition, according to the first method, each of the threads #0 to #3 accesses all the rows in the array 42. Thus, since the threads #0 to #3 exclusively access the array 42, parallelization is not substantially performed.

FIG. 9 illustrates an example of a first program after parallelization.

For each of description, the parallel processing code generated from the source code 51 illustrated in FIG. 7 is represented in source code format. In reality, a processing code based on the OpenMP reduction directive is generated by using an intermediate code.

The source code 52 is a parallel processing code obtained by converting the source code 51 in accordance with the first method illustrated in FIG. 8. As in the source code 51, the integers n and m, the array sum of n rows of an integer type, the 2D array a of n rows and m columns of an integer type, and the loop variables i and j are defined in the source code 52. In addition, an array sum_k of n rows of an integer type is defined in the source code 52, as a copy of the array sum, which is the reduction variable. The array sum_k corresponds to the arrays sum0 to sum3 in FIG. 8. The array sum, which is the original variable, is assumed to have been defined as a shared variable in an upper module. However, since the array sum_k, which is a copied variable, appears only in this subroutine, the array sum_k is determined to be a private variable when compilation is performed.

In addition, a code for initializing the array sum_k is inserted in the source code 52. The initial value of the array sum_k is determined based on the reduction operator. For example, when the reduction operator is "+" or "−," the initial value in each row in the array sum_k is 0. When the reduction operators are "×," ".AND.," and ".OR.," the initial values are "1," "TRUE.," and "FALSE.," respectively. When the reduction operators are "MAX" and "MIN," the initial values are the minimum possible value and the maximum possible value, respectively.

In addition, as in the source code 51, a nested loop including an outer loop in which the value of the loop variable j is increased from 1 to m by 1 and an inner loop in which the value of the loop variable i is increased from 1 to n by 1 is defined in the source code 52. In the inner loop, an operation of adding a(i,j) to sum_k(i) used in place of sum(i) is defined. This indicates that each of the plurality of threads stores intermediate data in a private variable, namely, not in the original shared variable but in a copy thereof. In the source code 52 illustrated in FIG. 9, description of the division of the array a into column groups is omitted.

In addition, a code for aggregating the intermediate data stored in the array sum_k, which is a private variable, in the array sum, which is the shared variable, is inserted into the source code 52. More specifically, a code for adding sum_k (i) to sum(i) (i=1 to n) is inserted into the source code 52. In the source code 52 illustrated in FIG. 9, description of exclusive control performed when the array sum is accessed is omitted.

Figure 10:
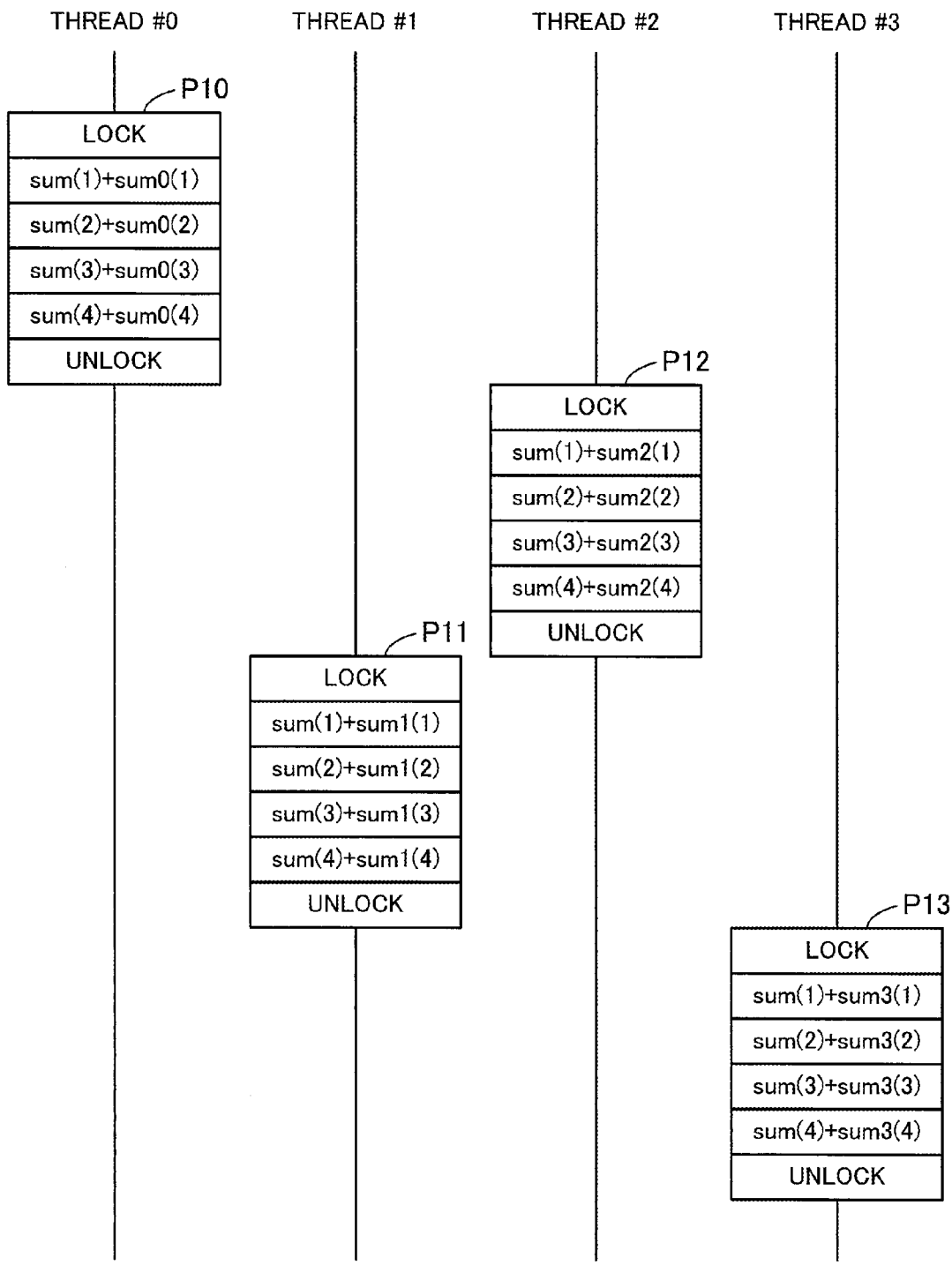
FIG. 10 illustrates an example of timing at which the first reduction processing is performed.

FIG. 10 illustrates an example of timing at which the first reduction processing is performed.

In the first method, when the threads #0 to #3 aggregate their intermediate data, parallelization is not substantially performed. For example, first, the thread #0 locks the array 42 and prevents the other threads from accessing the array 42. The thread #0 adds sum0(1) to sum(1), sum0(2) to sum(2), sum0(3) to sum(3), and sum0(4) to sum(4). Next, the thread #0 unlocks the array 42 (P10), and one of the other threads is allowed to access the array 42.

Next, the thread #2 locks the array 42 and prevents the other threads from accessing the array 42. The thread #2 adds sum2(1) to sum(1), sum2(2) to sum(2), sum2 (3) to sum(3), and sum2 (4) to sum(4). Next, the thread #2 unlocks the array 42 (P12), and one of the other threads is allowed to access the array 42.

Next, the thread #1 locks the array 42 and prevents the other threads from accessing the array 42. The thread #1 adds sum1(1) to sum(1), sum1(2) to sum(2), sum1 (3) to sum(3), and sum1 (4) to sum(4). Next, the thread #1 unlocks the array 42 (P11), and one of the other threads is allowed to access the array 42.

Finally, the thread #3 locks the array 42. The thread #3 adds sum3(1) to sum(1), sum3(2) to sum(2), sum3 (3) to sum(3), and sum3 (4) to sum(4). Next, the thread #3 unlocks the array 42 (P13). The above order in which the threads #0 to #3 lock the array 42 is only an example. The threads #0 to #3 may lock the array 42 in a different order, depending on their execution statuses.

With this method in which the threads #0 to #3 lock the array 42 when aggregating their intermediate data, the threads #0 to #3 sequentially access the array 42. Namely, one of the threads #0 to #3 that locks the array first reflects its intermediate data in the array 42, and the other threads need to wait until the array 42 is unlocked. Thus, since the aggregation of the intermediate data is not parallelized, there is a problem that a certain length of time is needed. There is another method in which the arrays 43a to 43d are stored in the shared area 122 instead of in the stack areas 121a to 121d. In this way, the threads #0 to #3 are able to access all the intermediate data and aggregate their intermediate data without locking the array 42. However, according to this method, when the arrays 43a to 43d are variable-length data, there is a problem that overhead is caused to dynamically allocate an area in the shared area 122. To solve this problem, the parallel computing device 100 may perform reduction processing according to a second method described below.

Figure 11:
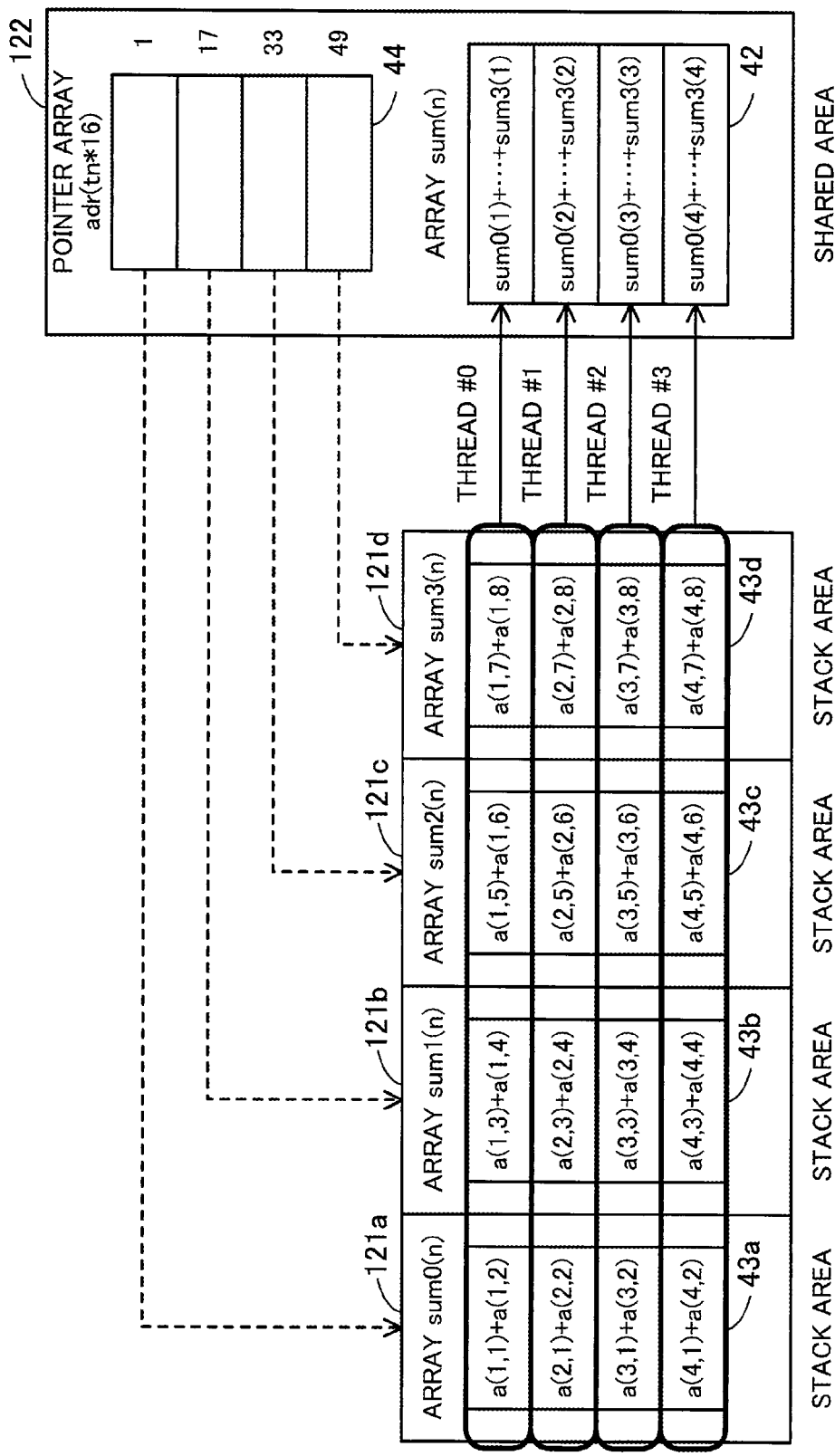
FIG. 11 illustrates an example of second reduction processing.

FIG. 11 illustrates an example of second reduction processing.

As in the first method, the thread #0 generates the array 43a (array sum0) in the stack area 121a. The thread #1 generates the array 43b (array sum1) in the stack area 121b. The thread #2 generates the array 43c (array sum2) in the stack area 121c. The thread #3 generates the array 43d (array sum3) in the stack area 121d. The parallel computing device 100 generates the array 42 (array sum) in the shared area 122.

In addition, the parallel computing device 100 generates a pointer array 44 (a pointer array adr) in the shared area 122. The pointer array 44 holds addresses that indicate the locations of the arrays 43a to 43d on the RAM 102 (for example, physical addresses that indicate the heads of the arrays 43a to 43d, respectively). The thread #0 stores the address of the array 43a in a row that corresponds to the thread #0 in the pointer array 44. The thread #1 stores the address of the array 43b in a row that corresponds to the thread #1 in the pointer array 44. The thread #2 stores the address of the array 43c in a row that corresponds to the thread #2 in the pointer array 44. The thread #3 stores the address of the array 43d in a row that corresponds to the thread #3 in the pointer array 44.

The threads #0 to #3 generate their intermediate data in the same way as in the above first method. The second method differs from the first method in aggregating the intermediate data. The parallel computing device 100 divides the array 42 into rows and allocates a row to each of the threads #0 to #3. Of all the intermediate data stored in the arrays 43a to 43d, each of the threads #0 to #3 aggregates the intermediate data corresponding to the row allocated thereto and stores the resultant data in the array 42. Since each of the threads #0 to #3 accesses a different row of all the rows in the array 42, the intermediate data is aggregated in parallel. Each of the threads #0 to #3 is able to access the stack areas that correspond to the other threads on the basis of the addresses stored in the pointer array 44.

For example, the threads #0 to #3 handle the 1st to 4th columns, respectively. The thread #0 reads sum0(1) from the stack area 121a. In addition, the thread #0 refers to the pointer array 44 and reads sum1(1) from the stack area 121b, sum2(1) from the stack area 121c, and sum3(1) from the stack area 121d. The thread #0 stores the sum of sum0(1) to sum3(1) in sum(1) in the shared area 122.

Likewise, the thread #1 refers to the pointer array 44 and reads sum0(2) from the stack area 121a, sum1(2) from the stack area 121b, sum2(2) from the stack area 121c, and sum3(2) from the stack area 121*d*. The thread #1 stores the sum of the sum0(2) to sum3(2) in sum(2) in the shared area 122.

The thread #2 refers to the pointer array 44 and reads sum0(3) from the stack area 121*a*, sum1(3) from the stack area 121*b*, sum2(3) from the stack area 121*c*, and sum3(3) from the stack area 121*d*. The thread #2 stores the sum of sum0(3) to sum3(3) in sum(3) in the shared area 122.

The thread #3 refers to the pointer array 44 and reads sum0(4) from the stack area 121*a*, sum1 (4) from the stack area 121*b*, sum2(4) from the stack area 121*c*, and sum3(4) from the stack area 121*d*. The thread #3 stores the sum of sum0(4) to sum3(4) in sum(4) in the shared area 122.

In this way, sum(1) represents the sum of a(1,1) to a(1,8), and sum(2) represents the sum of a(2,1) to a(2,8). In addition, sum(3) represents the sum of a(3,1) to a(3,8), and sum(4) represents the sum of a(4,1) to a(4,8). Thus, the resultant data stored in the array 42 according to the second method matches the resultant data obtained when parallelization is not performed or the resultant data obtained according to the first method in principle. However, depending on the variable type, for example, when an element in the array 42 is a floating-point number, the order of operations could be changed, and as a result, an operation error could occur. In addition, according to the second method, since each of the threads #0 to #3 accesses a different row in the array 42, the intermediate data is aggregated in parallel without exclusive control.

Each of the CPU cores 101*a* to 101*d* includes a cache memory. When accessing data, each of the CPU cores 101*a* to 101*d* loads the data from the RAM 102 to its cache memory. Each of the CPU cores 101*a* to 101*d* loads data to its cache memory on the basis of a certain size called a cache line. When a first CPU core and a second CPU core access different data, if the locations of both of the data on the RAM 102 are closer to each other than the cache line size, the data is read to both of the cache memories of the first and second CPU cores.

If this happens, a problem with data consistency between the cache memories arises. When the first CPU core updates data on its cache memory, the second CPU core performs reading from the RAM 102 after discarding the entire cache line including the data. This problem is often referred to as "false sharing between cache memories." False sharing could deteriorate the data access performance.

Thus, to avoid false sharing, when the threads #0 to #3 of the parallel computing device 100 store their addresses in the pointer array 44, the threads #0 to #3 separate the rows in which the addresses are stored from each other. Namely, when one thread and another thread store their respective addresses, these addresses are separated from each other more than the cache line size. For example, when the cache line size is 128 bytes and the size of a single address is 8 bytes, the address stored by one thread and the address stored by another thread are separated by 16 rows or more.

In this case, the pointer array 44 has a length corresponding to the number of threads×16. The thread #0 stores an address in the 1st row in the pointer array 44. The thread #1 stores an address in the 17th row in the pointer array 44. The thread #2 stores an address in the 33rd row in the pointer array 44. The thread #3 stores an address in the 49th row in the pointer array 44. No rows other than the above rows are used. In this way, since the addresses of different threads are not read to the same cache line, false sharing is avoided.

If the number of threads that are started is dynamically determined at the time of an execution, the pointer array 44 having a length based on the maximum thread number may statically be generated in the shared area 122. The number of CPU cores may be estimated as the maximum thread number. For example, when the CPU 101 includes four CPU cores (CPU cores 101*a* to 101*d*), the maximum thread number is estimated as 4. In this way, since an area is statically allocated to the pointer array 44 when compilation is performed, overhead to dynamically allocate an area in the shared area 122 is not caused.

False sharing between cache memories could occur when the threads #0 to #3 access the array 42. Thus, it is preferable that a row handled by one thread and a row handled by another thread in the array 42 be separated by the cache line size or more. For example, when the cache line size is 128 bytes and the size of a single integer is 8 bytes, it is preferable that each thread handle at least 16 rows in the array 42.

To avoid false sharing, the parallel computing device 100 may select an intermediate data aggregation method on the basis of the number of rows in the array 42. For example, when the length of the array 42, which is the reduction variable, corresponds to the number of threads×15 rows or less, the parallel computing device 100 aggregates the intermediate data according to the first method illustrated in FIG. 8. In contrast, when the length of the array 42 corresponds to the number of threads×16 rows or more, the parallel computing device 100 aggregates the intermediate data according to the second method.

FIG. 12 illustrates an example of a second program after parallelization.

For ease of description, the parallel processing code generated from the source code 51 illustrated in FIG. 7 is represented in source code format. A source code 53 is a parallel processing code obtained by converting the source code 51 in accordance with the second method illustrated in FIG. 11.

As in the source codes 51 and 52, the integers n and m, the array sum of n rows of an integer type, the 2D array a of n rows and m columns of an integer type, and the loop variables i and j are defined in the source code 53. In addition, as in the source code 52, an array sum_k of n rows of an integer type is defined in the source code 53, as a copy of the array sum, which is the reduction variable.

In addition, the pointer array adr of tn×16 rows of an integer type is defined in the source code 53 (tn represents the number of threads determined based on the target CPU). The pointer array adr is handled as a shared variable by adding a save attribute. In addition, an array var of n rows of an integer type is defined in the source code 53. In addition, a pointer ptr is defined in the source code 53. The pointer ptr is an address that indicates the head of data, and the data indicated by the pointer ptr is accessed as the array var.

In addition, a code for storing the address of the array sum_k in the (tid×16+1)th row in the pointer array adr is inserted in the source code 53 (tid represents a thread ID). In this way, the addresses of the threads #0 to #3 are stored while being separated from each other by 16 rows. In addition, as in the source code 52, a code for initializing the array sum_k is inserted in the source code 53. In addition, as in the source code 52, a nested loop including an outer loop in which the value of the loop variable j is increased from 1 to m by 1 and an inner loop in which the value of the loop variable i is increased from 1 to n by 1 is defined in the source code 53. In the inner loop, an operation of adding a(i,j) to sum_k(i) used in place of sum(i) is defined. In the source code 53 illustrated in FIG. 12, description of the division of the array a into column groups is omitted.

In addition, a code for aggregating the intermediate data stored in the array sum_k, which is a private variable, in the array sum, which is a shared variable, is inserted into the source code 53. More specifically, a nested loop including an outer loop in which the value of the loop variable j is increased from 0 to tn−1 by 1 and an inner loop in which the value of the loop variable i is increased from 1 to n by 1 is defined in the source code 53. Between the outer and inner loops, a code for referring to the address in the (j×16+1)th row in the pointer array adr as the pointer ptr is inserted. In the inner loop, a code for adding the i-th row in the array var indicated by the pointer ptr to sum(i) is inserted. In FIG. 12, description of the division of the array sum into rows is omitted.

In addition, in the source code 53, before and after the code for aggregating the intermediate data, directives indicating barrier synchronization are inserted. Barrier synchronization is synchronization processing in which processing performed by a plurality of threads is controlled until the processing reaches a predetermined point. Since barrier synchronization is performed immediately before the aggregation of the intermediate data is started, the threads #0 to #3 do not start their aggregation until all the threads #0 to #3 finish generating the intermediate data. This is because each thread accesses the intermediate data generated by the other threads. In addition, since barrier synchronization is performed immediately after the aggregation of the intermediate data is ended, the threads #0 to #3 do not start the next processing until all the threads #0 to #3 finish aggregating the intermediate data. This is to prevent the intermediate data from being deleted from the stack areas 121a to 121d before the completion of the aggregation.

There are some methods for realizing the above barrier synchronization. For example, when the CPU cores 101a to 101d support barrier synchronization, a register included in each of the CPU cores 101a to 101d is provided with flags corresponding to all the CPU cores. If a CPU core has its processing proceed to a predetermined point, the CPU core halts the processing, notifies the other CPU cores of the status, and changes the flag corresponding to the CPU core from 0 to 1. When all the flags corresponding to the CPU cores 101a to 101d represent 1, the CPU cores resume their processing. The shared area 122 may be provided with flags corresponding to the CPU cores 101a to 101d.

Figure 13:
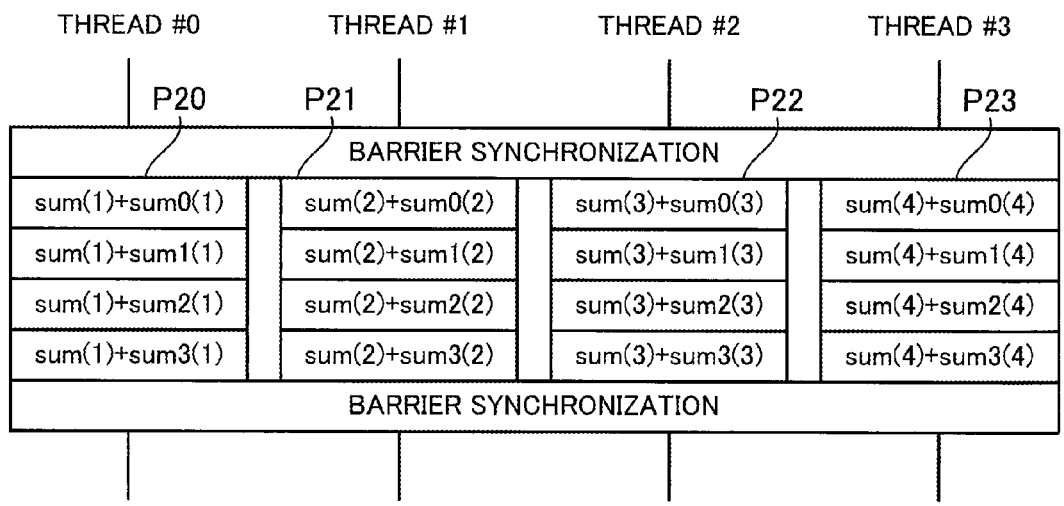
FIG. 13 illustrates an example of timing at which the second reduction processing is performed.

FIG. 13 illustrates an example of timing at which the second reduction processing is performed.

In the second method, the threads #0 to #3 are able to aggregate their intermediate data in parallel. First, in accordance with barrier synchronization, the threads #0 to #3 wait until the threads #0 to #3 finish generating their intermediate data. When the threads #0 to #3 finish generating their intermediate data, the thread #0 refers to the pointer array 44, accesses sum0(1), and adds sum0(1) to sum(1). The thread #0 refers to the pointer array 44, accesses sum1(1), and adds sum1(1) to sum(1). The thread #0 refers to the pointer array 44, accesses sum2(1), and adds sum2(1) to sum(1). The thread #0 refers to the pointer array 44, accesses sum3(1), and adds sum3(1) to sum(1) (P20).

In addition, when the threads #0 to #3 finish generating their intermediate data, in parallel with the thread #0, the thread #1 refers to the pointer array 44, accesses sum0(2), and adds sum0 (2) to sum(2). The thread #1 refers to the pointer array 44, accesses sum1(2), and adds sum1(2) to sum(2). The thread #1 refers to the pointer array 44, accesses sum2(2), and adds sum2(2) to sum(2). The thread #1 refers to the pointer array 44, accesses sum3(2), and adds sum3(2) to sum(2) (P21).

In addition, when the threads #0 to #3 finish generating their intermediate data, in parallel with the threads #0 and #1, the thread #2 refers to the pointer array 44, accesses sum0(3), and adds sum0(3) to sum(3). The thread #2 refers to the pointer array 44, accesses sum1(3), and adds sum1(3) to sum(3). The thread #2 refers to the pointer array 44, accesses sum2(3), and adds sum2(3) to sum(3). The thread #2 refers to the pointer array 44, accesses sum3(3), and adds sum3(3) to sum(3) (P22).

In addition, when the threads #0 to #3 finish generating their intermediate data, in parallel with the threads #0 to #2, the thread #3 refers to the pointer array 44, accesses sum0 (4), and adds sum0(4) to sum(4). The thread #3 refers to the pointer array 44, accesses sum1(4), and adds sum1(4) to sum(4). The thread #3 refers to the pointer array 44, accesses sum2(4), and adds sum2(4) to sum(4). The thread #3 refers to the pointer array 44, accesses sum3(4), and adds sum3(4) to (4) (P23).

Next, in accordance with barrier synchronization, the threads #0 to #3 wait until the threads #0 to #3 finish aggregating their intermediate data. When the threads #0 to #3 finish aggregating their intermediate data, the thread #0 may delete the array 43a from the stack area 121a. The thread #1 may delete the array 43b from the stack area 121b. The thread #2 may delete the array 43c from the stack area 121c. The thread #3 may delete the array 43d from the stack area 121d.

Next, functions of the parallel computing device 100 and the compiling device 200 will be described.

Figure 14:
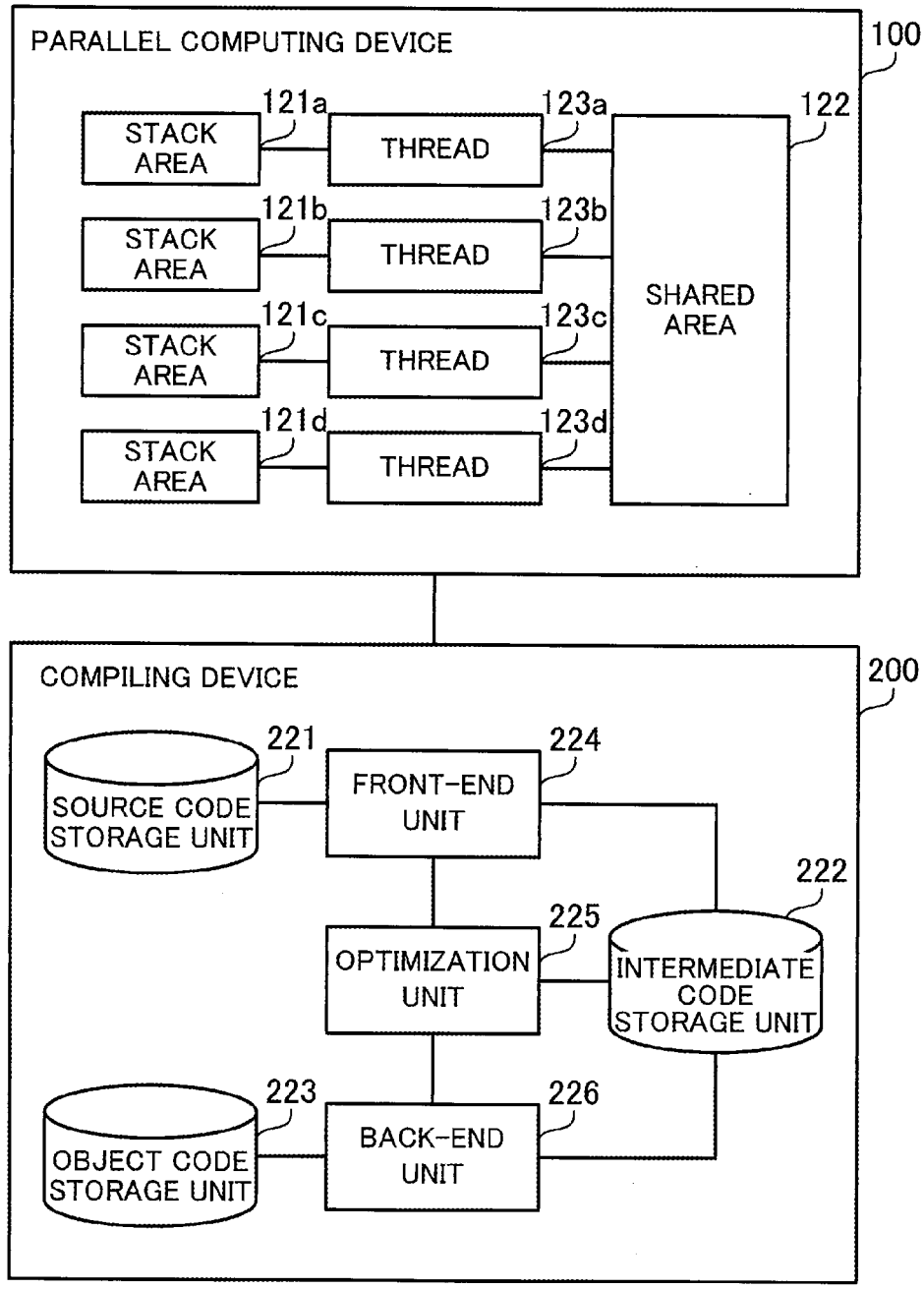
FIG. 14 illustrates examples of functions of the parallel computing device and the compiling device.

FIG. 14 illustrates examples of functions of the parallel computing device 100 and the compiling device 200.

The parallel computing device 100 includes the stack areas 121a to 121d, the shared area 122, and threads 123a to 123d. The stack areas 121a to 121d and the shared area 122 may be realized as storage areas allocated on the RAM 102. The thread 123a to 123d may be realized as program modules executed by the CPU 101. The program modules that realize the thread 123a to 123d are generated by the compiling device 200. The threads 123a to 123d are executed by the CPU cores 101a to 101d, respectively The stack areas 121a to 121d hold the arrays 43a to 43d, respectively, and the shared area 122 holds the array 42 and the pointer array 44.

The thread 123a generates the array 43a in the stack area 121a and stores the address of the array 43a in the pointer array 44. In addition, the thread 123a performs an array operation on the columns allocated thereto among the column groups in the 2D array 41 and stores the intermediate data in the array 43a. In addition, the thread 123a accesses the arrays 43a to 43d by referring to the pointer array 44, performs a reduction operation on a row allocated thereto among the rows in the arrays 43a to 43d, and stores the resultant data in the array 42.

Likewise, the thread 123b generates the array 43b in the stack area 121b and stores the address of the array 43b in the pointer array 44. In addition, the thread 123b performs an array operation on the columns allocated thereto among the column groups in the 2D array 41 and stores the intermediate data in the array 43b. In addition, the thread 123b accesses the arrays 43a to 43d by referring to the pointer array 44, performs a reduction operation on a row allocated thereto among the rows in the arrays 43a to 43d, and stores the resultant data in the array 42.

Likewise, the thread 123c generates the array 43c in the stack area 121c and stores the address of the array 43c in the pointer array 44. In addition, the thread 123c performs an array operation on the columns allocated thereto among the column groups in the 2D array 41 and stores the intermediate data in the array 43c. In addition, the thread 123c accesses the arrays 43a to 43d by referring to the pointer array 44, performs a reduction operation on a row allocated thereto among the rows in the arrays 43a to 43d, and stores the resultant data in the array 42.

Likewise, the thread 123d generates the array 43d in the stack area 121d and stores the address of the array 43d in the pointer array 44. In addition, the thread 123d performs an array operation on the columns allocated thereto among the column groups in the 2D array 41 and stores the intermediate data in the array 43d. In addition, the thread 123d accesses the arrays 43a to 43d by referring to the pointer array 44, performs a reduction operation on a row allocated thereto among the rows in the arrays 43a to 43d, and stores the resultant data in the array 42.

The threads 123a to 123d correspond to the threads #0 to #3 in FIG. 13, respectively.

The compiling device 200 includes a source code storage unit 221, an intermediate code storage unit 222, an object code storage unit 223, a front-end unit 224, an optimization unit 225, and a back-end unit 226. The source code storage unit 221, the intermediate code storage unit 222, and the object code storage unit 223 may be realized as storage areas allocated in the RAM 202 or the HDD 203. The front-end unit 224, the optimization unit 225, and the back-end unit 226 may be realized as program modules executed by the CPU 201.

The source code storage unit 221 holds a source code (for example, the source code 51 in FIG. 7) created by a user. The source code is written in a high level language such as Fortran. A source code that is not created for parallel processing may be used. An OpenMP directive that instructs parallelization may be included in the source code. The intermediate code storage unit 222 holds an intermediate code converted from the source code. The intermediate code is written in an intermediate language used in the compiling device 200. The object code storage unit 223 holds a machine-readable object code that corresponds to the source code. The object code is executed by the parallel computing device 100.

The front-end unit 224 performs front-end processing of compilation. Namely, the front-end unit 224 reads the source code from the source code storage unit 221 and analyzes the read source code. The analysis of the source code includes lexical analysis, syntax analysis, and semantic analysis. The front-end unit 224 generates an intermediate code that corresponds to source code and stores the generated intermediate code in the intermediate code storage unit 222.

The optimization unit 225 reads the intermediate code from the intermediate code storage unit 222 and performs various kinds of optimization on the intermediate code so that an object code having a high execution efficiency is generated. The optimization includes parallelization in which a plurality of CPU cores are used. If the optimization unit 225 has an automatic parallelization function, the optimization unit 225 detects processing that can be performed in parallel from the intermediate code and rewrites the intermediate code so that a plurality of threads are executed in parallel. In addition, if an OpenMP directive is added in the source code and a compile option for enabling the OpenMP directive is specified, the optimization unit 225 rewrites the intermediate code so that the processing to which the OpenMP directives is added is performed in parallel. In particular, if a reduction directive is added in the source code, the optimization unit 225 rewrites the intermediate code so that a plurality of threads perform the reduction processing.

The back-end unit 226 performs back-end processing of compilation. Namely, the back-end unit 226 reads the optimized intermediate code from the intermediate code storage unit 222 and converts the read intermediate code into an object code. The back-end unit 226 may generates an assembly code written in an assembly language from the intermediate code and convert the assembly code into an object code convert. The back-end unit 226 stores the generated object code in the object code storage unit 223.

Figure 15:
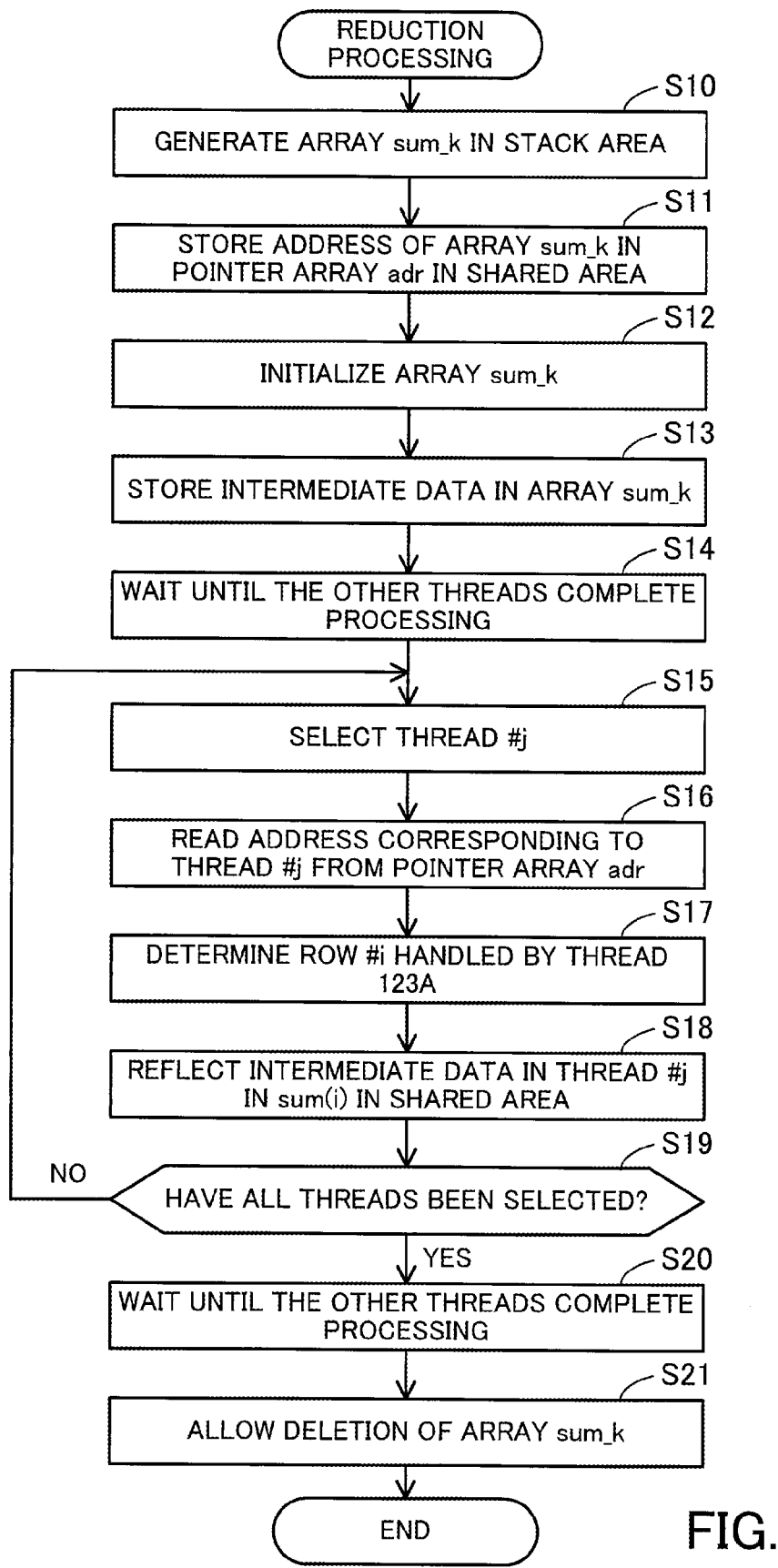
FIG. 15 is a flowchart illustrating an example of a procedure of reduction processing.

FIG. 15 is a flowchart illustrating an example of a procedure of reduction processing.

Hereinafter, processing performed by the thread 123a started based on the object code generated by the compiling device 200 will be described. The threads 123b to 123d are also started based on the same object code and performs the same processing.

(S10) The thread 123a generates the array 43a (array sum_k), which is a copy of the array 42 (array sum), in the stack area 121a that corresponds to the thread 123a.

(S11) The thread 123a stores the address of the head of the array 43a in a row that is included in the pointer array 44 (pointer array adr) in the shared area 122 and that corresponds to the thread 123a. If the thread ID of the thread 123a is tid, the row in which the address is stored is the (tid×16+1)th row in the pointer array 44, for example.

(S12) The thread 123a initializes the array 43a. If the reduction operator is "+," the thread 123a initializes each row in the array 43a to 0.

(S13) The thread 123a generates intermediate data and stores the generated intermediate data in the array 43a. For example, for each of the 1st to 4th rows in the 2D array 41, the thread 123a aggregates the values in the 1st and 2nd columns, which are handled by the thread 123a, and stores the sum in the array 43a.

(S14) In accordance with barrier synchronization, the thread 123a waits until the threads 123b to 123d complete their processing in step S13.

(S15) The thread 123a selects one of the threads 123a to 123d. The thread that has been selected will hereinafter be referred to as a thread #j.

(S16) The thread 123a reads the address corresponding to the thread #j from the pointer array 44 in the shared area 122. If the thread ID of the thread #j is j, the row from which the address is read is the (j×16+1)th row in the pointer array 44, for example.

(S17) The thread 123a determines a row in which the thread 123a aggregates intermediate data in the array 42. The row determined in step S17 will be referred to as a row #i.

(S18) On the basis of the address read in step S16, the thread 123a reads the intermediate data in the i-th row from the stack area that corresponds to the thread #j. The thread 123a reflects the read intermediate data in the i-th row (sum(i)) in the array 42 in the shared area 122. If the reduction operator is "+," the thread 123a adds the value read from the stack area that corresponds to the thread #j to sum(i).

(S19) The thread 123a determines whether all the threads 123a to 123d have been selected in step S15. If all the threads have been selected, the processing proceeds to step S20. Otherwise, the processing returns to step S15.

(S20) In accordance with barrier synchronization, the thread 123a waits until the threads 123b to 123d complete their processing in steps S15 to S19.

(S21) The thread 123a allows deletion of the array 43a from the stack area 121a. The thread 123a ends the reduction processing.

Figure 16:
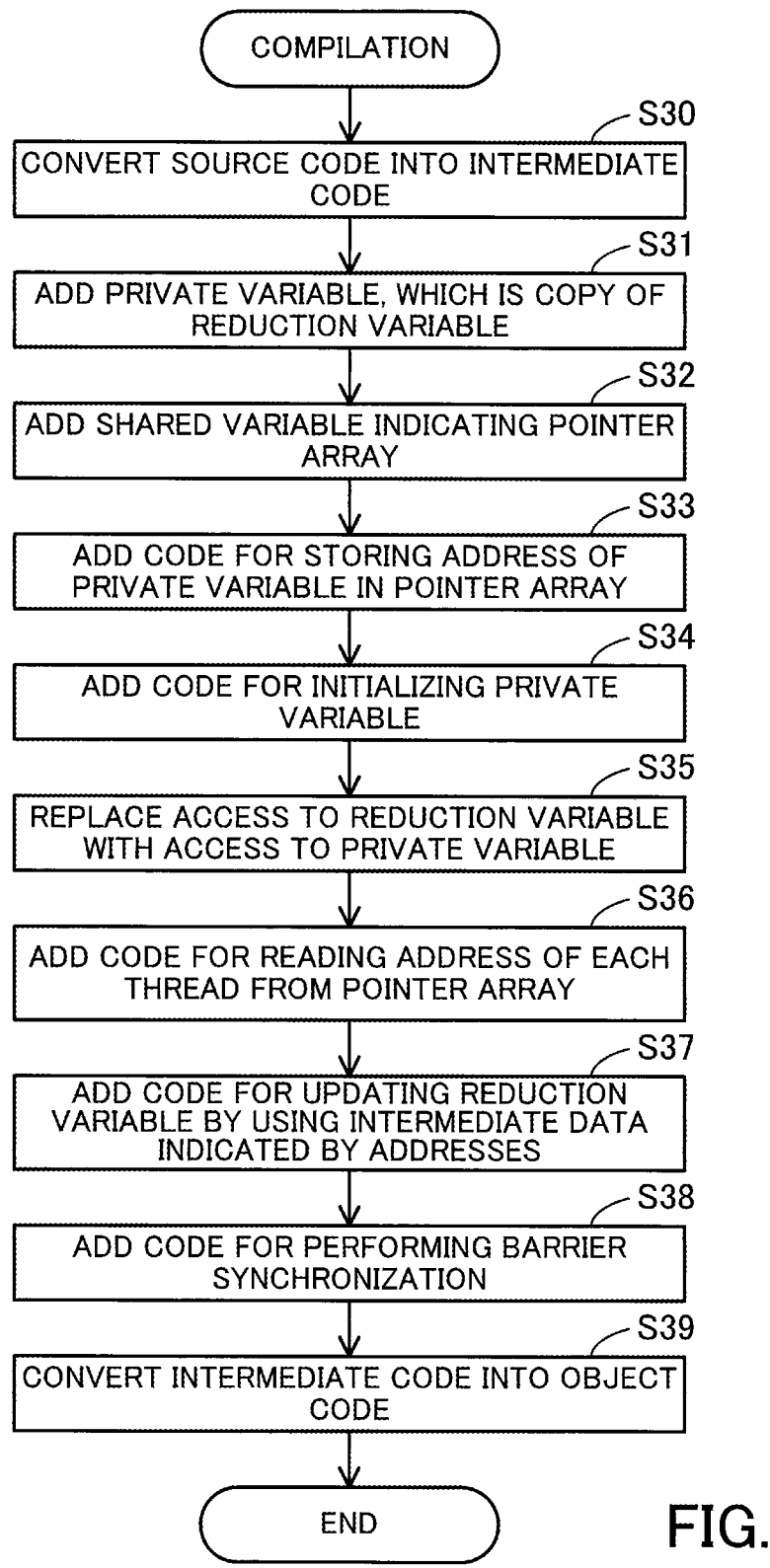
FIG. 16 is a flowchart illustrating an example of a procedure of compilation.

FIG. 16 is a flowchart illustrating an example of a procedure of compilation.

(S30) The front-end unit 224 reads a source code from the source code storage unit 221, analyzes the source code, and converts the source code into an intermediate code. The front-end unit 224 stores the intermediate code in the intermediate code storage unit 222. In the following steps S31 to S38, the optimization unit 225 performs processing for parallelization on the intermediate code.

(S31) The optimization unit 225 adds a private variable, which is a copy of the reduction variable specified by the reduction directive, in the intermediate code. Attributes of the private variable such as the data type, array length, and dimension are the same as those of the original reduction variable.

(S32) The optimization unit 225 adds a shared variable indicating a pointer array in the intermediate code. The length of the pointer array is determined based on the maximum number of CPU threads that execute the object code (for example, the number of CPU cores) and the cache line size.

(S33) The optimization unit 225 adds a code for storing the address of the private variable added in step S31 (for example, a physical address in the RAM 102) in the pointer array in the intermediate code. The row in which the address is stored is calculated from the corresponding thread ID.

(S34) The optimization unit 225 adds a code for initializing the private variable added in step S31 in the intermediate code. The initial value of the private variable is determined based on the reduction operator specified in the reduction directive.

(S35) The optimization unit 225 replaces access to the reduction variable included in the intermediate code with access to the private variable added in step S31.

(S36) The optimization unit 225 adds a code for reading the address of each thread stored in the pointer array in the intermediate code.

(S37) The optimization unit 225 adds a code for updating the reduction variable by using the intermediate data stored in the private variables indicated by the addresses in step S36 in the intermediate code. The updating of the reduction variable is performed by using the reduction operator specified.

(S38) The optimization unit 225 adds a code for causing a plurality of threads to perform barrier synchronization immediately before the code in step S36. In addition, the optimization unit 225 adds a code for causing the plurality of threads to perform barrier synchronization immediately after the code in step S37.

(S39) The back-end unit 226 reads the optimized intermediate code from the intermediate code storage unit 222 and converts the intermediate code into an object code. The back-end unit 226 stores the object code in the object code storage unit 223.

In the information processing system according to the third embodiment, the threads 123a to 123d are started by the CPU cores 101a to 101d, and the intermediate data is separately stored in the stack areas 121a to 121d that correspond to the threads 123a to 123d, respectively. In addition, the addresses that indicate the locations of the intermediate data are stored in the shared area 122. The threads 123a to 123d access the stack areas 121a to 121d by referring to the addresses stored in the shared area 122 and aggregate their intermediate data in parallel.

In this way, unlike the above second method in which the intermediate data is stored in the shared area 122, since no area needs to be dynamically allocated in the shared area 122 for the intermediate data in the present embodiment, the overhead, which is caused by the above second method, is not caused in the present embodiment. In addition, unlike the above first method in which the threads reflect their intermediate data in the resultant data in the shared area 122, since exclusive control among the threads 123a to 123d is not performed in the present embodiment, the above overhead, which is caused by the first method in which exclusive control is performed, is not caused in the present embodiment. In addition, the intermediate data is aggregated in parallel. In addition, since the threads 123a to 123d that have generated the intermediate data aggregate the necessary intermediate data, no new thread is started. Namely, while overhead is caused if a new thread is started, since no new thread is started in the present embodiment, no such overhead is caused in the present embodiment. Thus, the threads 123a to 123d are able to perform reduction processing at high speed.

As described above, the information processing according to the first embodiment may be realized by causing the parallel computing device 10 to execute a program. The information processing according to the second embodiment may be realized by causing the compiling device 20 to execute a program. The information processing according to the third embodiment may be realized by causing the parallel computing device 100 and the compiling device 200 to execute a program.

Each of these programs may be recorded in a computer-readable recording medium (for example, the recording medium 113 or 213). As the recording medium, for example, a magnetic disk, an optical disc, a magneto-optical disk, or a semiconductor memory may be used. Examples of the magnetic disk include a FD and an HDD. Examples of the optical disc include a CD, a CD-recordable (R)/rewritable (RW), a DVD, and a DVD-R/RW. The program may be recorded in a portable recording medium and distributed. In this case, after a copy of the program is created from the portable recording medium and the copy is stored in another recording medium such as an HDD (for example, the HDD 103 or 203), the copy is executed.

According to one aspect, a plurality of threads are able to aggregate intermediate data at high speed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A parallel computing apparatus comprising:
a first processor configured to execute a first thread and include a first cache memory having a cache line size;
a second processor configured to execute a second thread and include a second cache memory having the cache line size; and
a memory that is located outside of the first and second processors and is configured to include a first stack area, a second stack area and a shared area, the first cache memory and the second cache memory being different from the memory, the first stack area from the memory being assigned to the first thread, the second stack area from the memory being assigned to the second thread, the shared area being located outside of the first and second stack areas in the memory, the first processor uses the first stack area according to a first address space of the first thread, and the second processor uses the second stack area according to a second address space of the second thread that is different from the first address space, the first processor stores first data into the first stack area and stores address information into the shared area, the address information indicating a physical address for the first data in the memory, the second processor stores second data into the second stack area, accesses the first data based on the address information stored in the shared area, and generates third data based on the first data and the second data, the second processor stores fourth data into the second stack area and stores other address information into the shared area, said other address information indicating a physical address for the fourth data in the memory, the address information and said other address information being separated in the shared area by a predetermined distance that is equal to or larger than the cache line size, and the first processor stores fifth data into the first stack area, accesses the fourth data based on said other address information stored in the shared area, and generates sixth data based on the fourth data and the fifth data.

2. The parallel computing apparatus according to claim 1, wherein the first processor synchronizes the first thread and the second thread so that the first data is not deleted from the first stack area until at least the second processor accesses the first data.

3. A compiling apparatus comprising:

a memory configured to hold a first code that is to generate third data and sixth data; and a third processor configured to convert the first code into a second code that is to start a first thread for generating first data and fifth data and then generating the sixth data based on fourth data and the fifth data, and a second thread for generating second data and the fourth data and then generating the third data based on the first data and the second data, the second code causes a first processor that executes the first thread to store the first data into a first stack area of a memory and causes a second processor that executes the second thread to store the second data into a second stack area of the memory, the memory being located outside of the first and second processors, the first stack area from the memory being assigned to the first thread, the second stack area from the memory being assigned to the second thread, the first processor including a first cache memory having a cache line size, the second processor including a second cache memory having the cache line size, the first cache memory and the second cache memory being different from the memory, the first stack area being used by the first processor according to a first address space of the first thread, the second stack area being used by the second processor according to a second address space of the second thread that is different from the first address space, the second code causes the first processor to store address information into a shared area of the memory, the address information indicating a physical address for the first data in the memory, the shared area being located outside of the first and second stack areas in the memory, the second code causes the second processor to access the first data based on the address information stored in the shared area, the second code causes the second processor to store the fourth data into the second stack area and causes the first processor to store the fifth data into the first stack area, the second code causes the second processor to store other address information into the shared area, said other address information indicating a physical address for the fourth data in the memory, the address information and said other address information being separated in the shared area by a predetermined distance that is equal to or larger than the cache line size, and the second code causes the first processor to access the fourth data based on said other address information stored in the shared area.

4. A parallel processing method comprising:

starting, by a first processor, a first thread, the first processor including a first cache memory having a cache line size;

starting, by a second processor, a second thread, the second processor including a second cache memory having the cache line size;

storing, by the first processor, first data into a first stack area of a memory and storing address information into a shared area of the memory, the address information indicating a physical address for the first data in the memory, the memory being located outside of the first and second processors, the first stack area from the memory being assigned to the first thread, the first cache memory and the second cache memory being different from the memory, the first stack area being used by the first processor according to a first address space of the first thread;

storing, by the second processor, second data into a second stack area of the memory, the second stack area from the memory being assigned to the second thread, the shared area being located outside of the first and second stack areas in the memory, the second stack area being used by the second processor according to a second address space of the second thread that is different from the first address space;

storing, by the second processor, fourth data into the second stack area and storing other address information into the shared area, said other address information indicating a physical address for the fourth data in the memory, the address information and said other address information being separated in the shared area by a predetermined distance that is equal to or larger than the cache line size;

storing, by the first processor, fifth data into the first stack area;

accessing, by the second processor, the first data based on the address information stored in the shared area and generating third data based on the first data and the second data; and accessing, by the first processor, the fourth data based on said other address information stored in the shared area and generating sixth data based on the fourth data and fifth data.

* * * * *